No. 657,418. Patented Sept. 4, 1900.
H. INMAN.
MACHINE FOR MAKING PAPER BOX BLANKS.
(Application filed June 2, 1899.)
(No Model.) 7 Sheets—Sheet 1.

Witnesses
J. G. Hinkel
Arthur A. Fisher

Inventor
Horace Inman
by Leslie Freeman
Attorneys

No. 657,418. Patented Sept. 4, 1900.
H. INMAN.
MACHINE FOR MAKING PAPER BOX BLANKS.
(Application filed June 2, 1899.)
(No Model.) 7 Sheets—Sheet 3.

No. 657,418. Patented Sept. 4, 1900.
H. INMAN.
MACHINE FOR MAKING PAPER BOX BLANKS.
(Application filed June 2, 1899.)
(No Model.) 7 Sheets—Sheet 4.
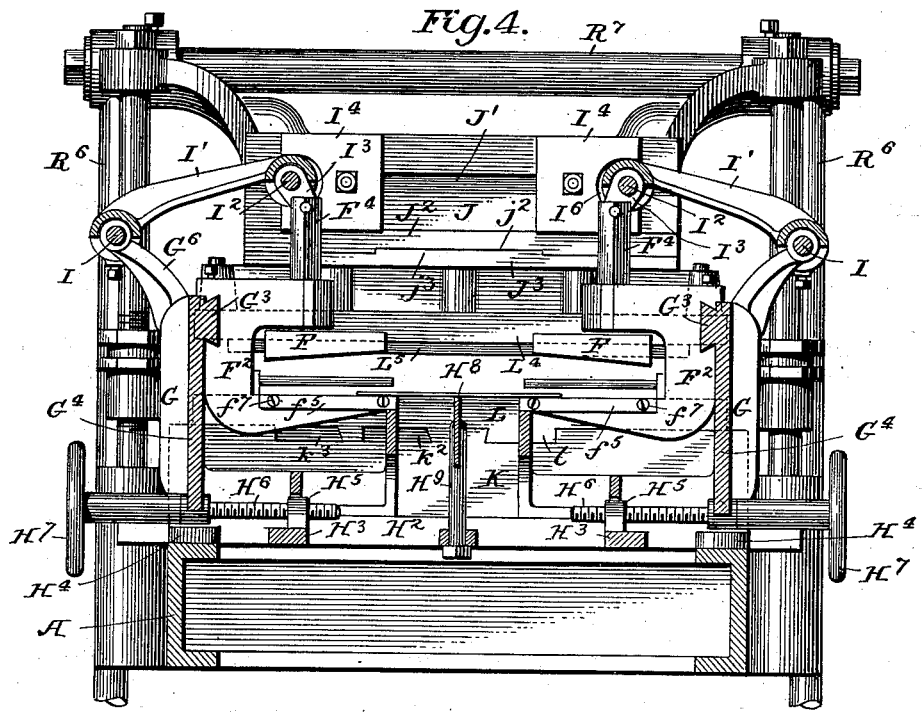
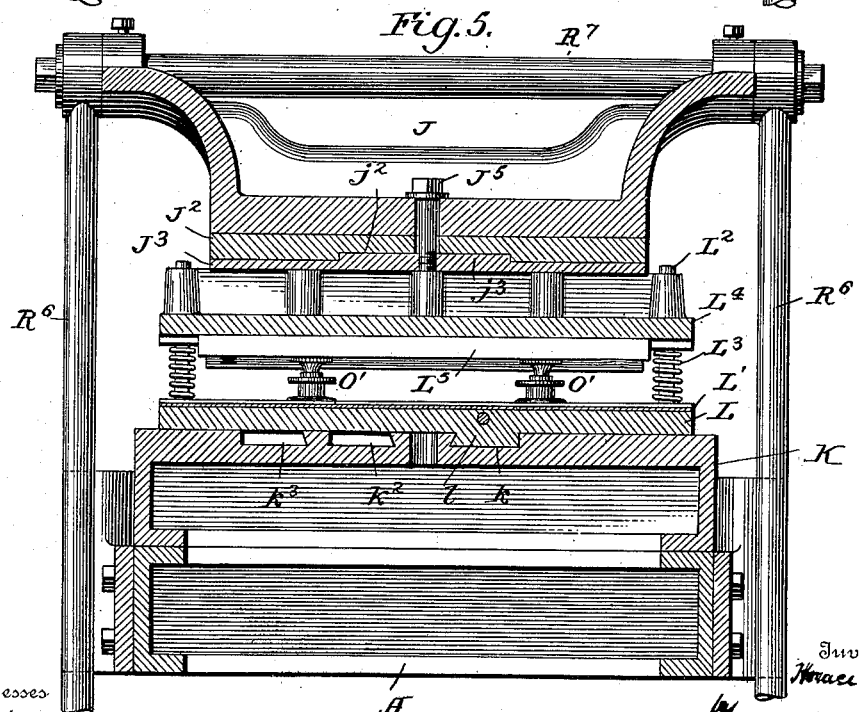

No. 657,418. Patented Sept. 4, 1900.
H. INMAN.
MACHINE FOR MAKING PAPER BOX BLANKS.
(Application filed June 2, 1899.)
(No Model.) 7 Sheets—Sheet 5.

Witnesses
J. G. Hinkel
Arthur A. Fisher

Inventor
Horace Inman
by Foster Freeman
Attorneys

No. 657,418. Patented Sept. 4, 1900.
H. INMAN.
MACHINE FOR MAKING PAPER BOX BLANKS.
(Application filed June 2, 1899.)

(No Model.) 7 Sheets—Sheet 6.

No. 657,418. Patented Sept. 4, 1900.
H. INMAN.
MACHINE FOR MAKING PAPER BOX BLANKS.
(Application filed June 2, 1899.)
(No Model.) 7 Sheets—Sheet 7.
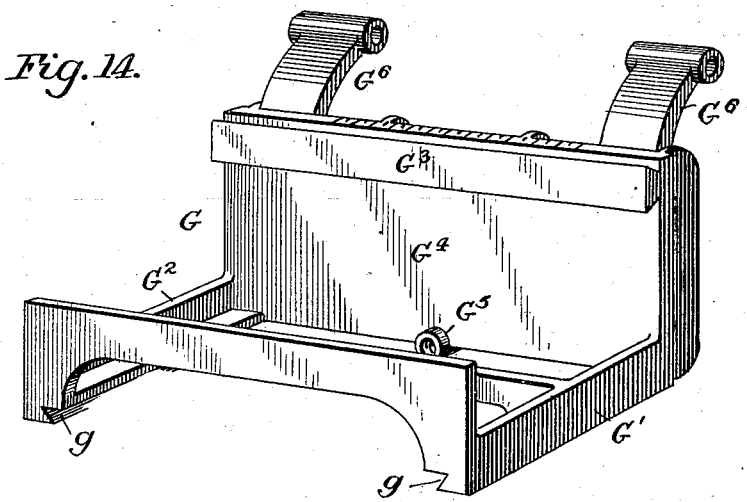
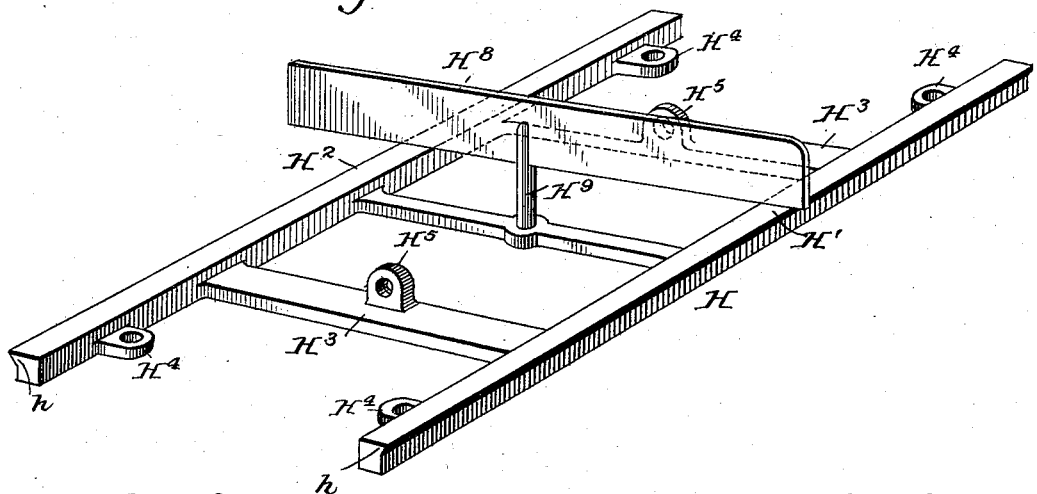
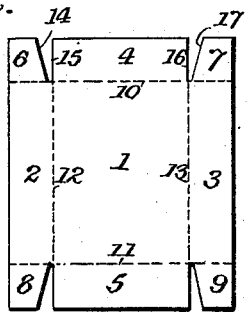
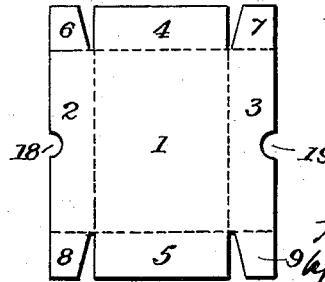
Witnesses
J. G. Hinkel
Arthur A. Fisher
Inventor
Horace Inman
by
Foster Freeman
Attorneys

UNITED STATES PATENT OFFICE.

HORACE INMAN, OF AMSTERDAM, NEW YORK.

MACHINE FOR MAKING PAPER-BOX BLANKS.

SPECIFICATION forming part of Letters Patent No. 657,418, dated September 4, 1900.

Application filed June 2, 1899. Serial No. 719,131. (No model.)

*To all whom it may concern:*

Be it known that I, HORACE INMAN, a citizen of the United States residing at Amsterdam, Montgomery county, State of New York, have invented certain new and useful Improvements in Blanking-Machines, of which the following is a specification.

My invention relates to machines for making paper-box blanks, and has for its object to improve and simplify this class of machines and to provide a machine all the parts of which are adjustable, so that it may be adapted for use in connection with different sizes and forms of blanks; and to these general ends my invention consists in a machine embodying the general features of construction, arrangement, and operation of parts substantially as hereinafter more particularly set forth.

Figure 1:
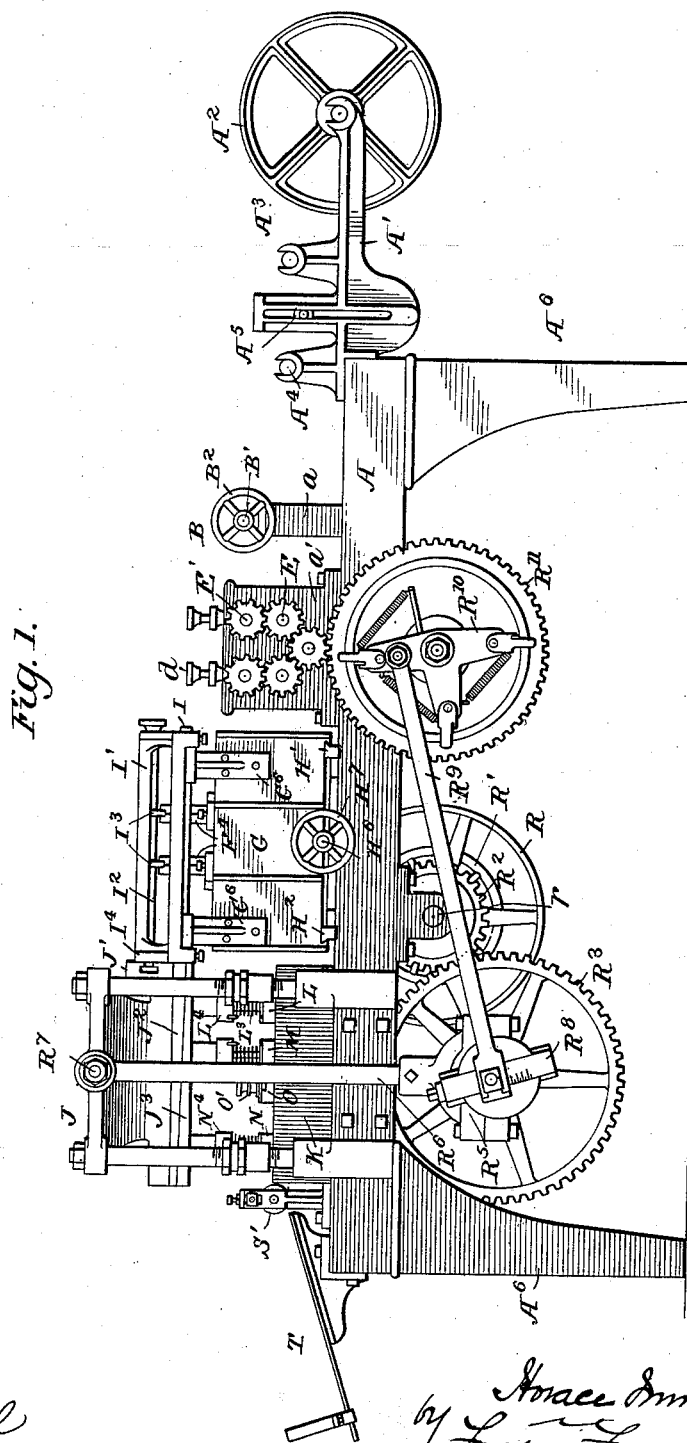
Figure 2:
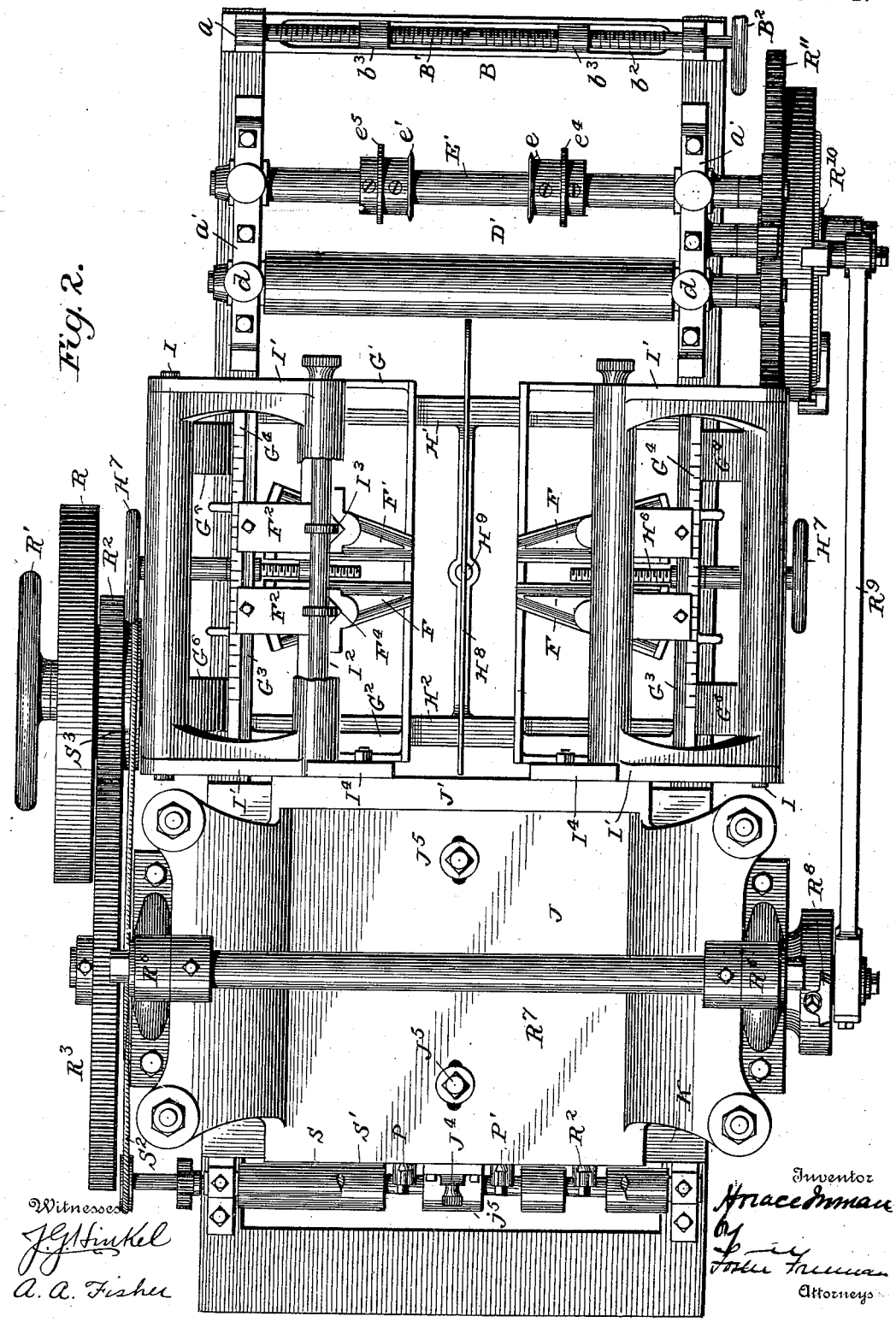
Figure 3:
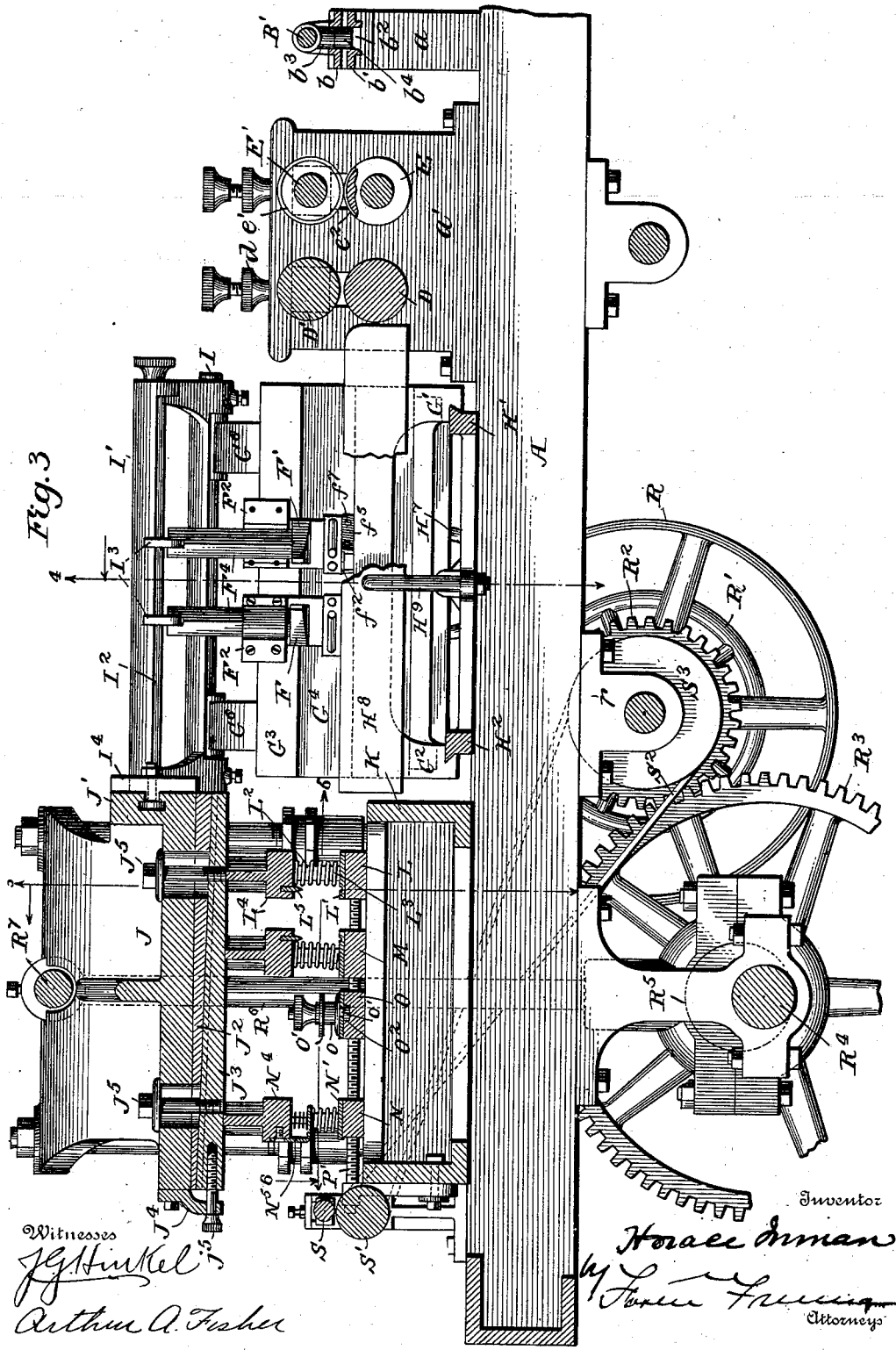
Figure 6:
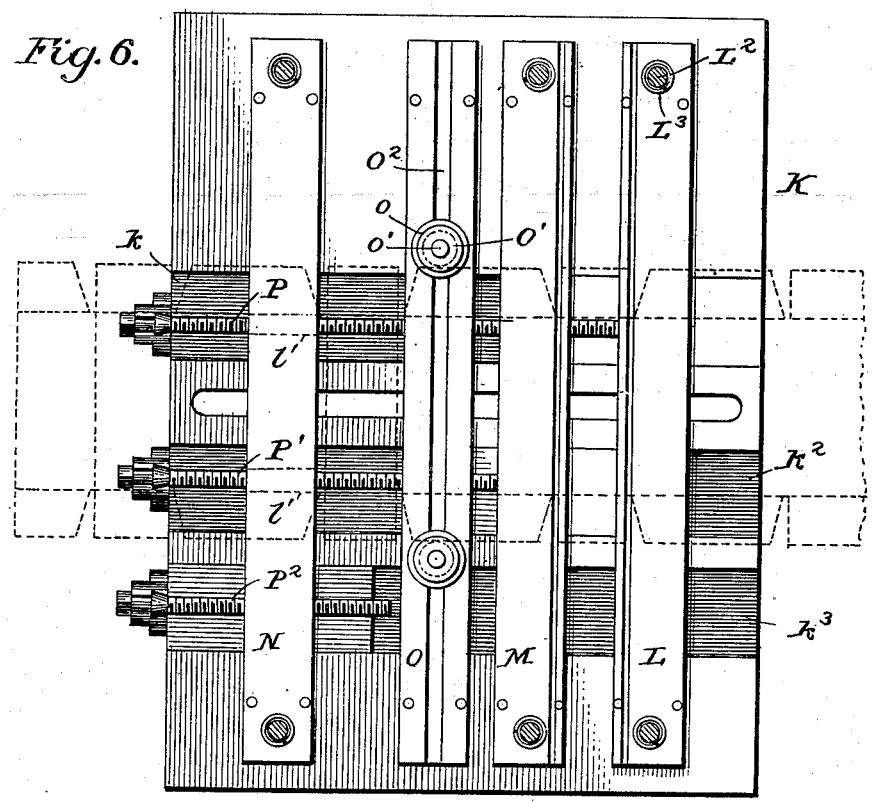
Figure 7:
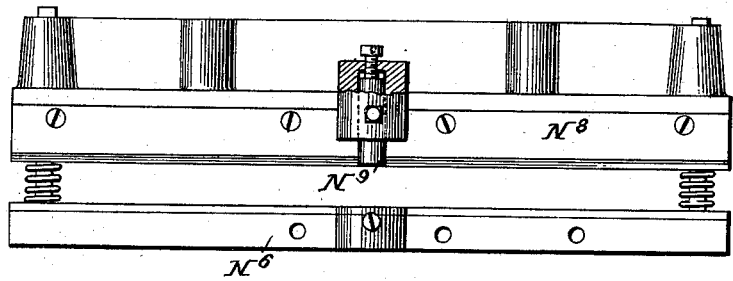
Figure 8:
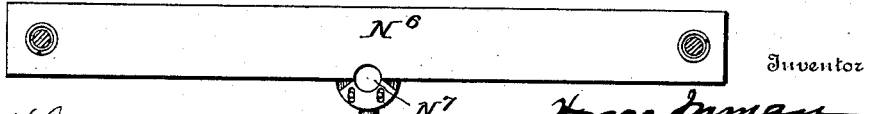
Figure 9:
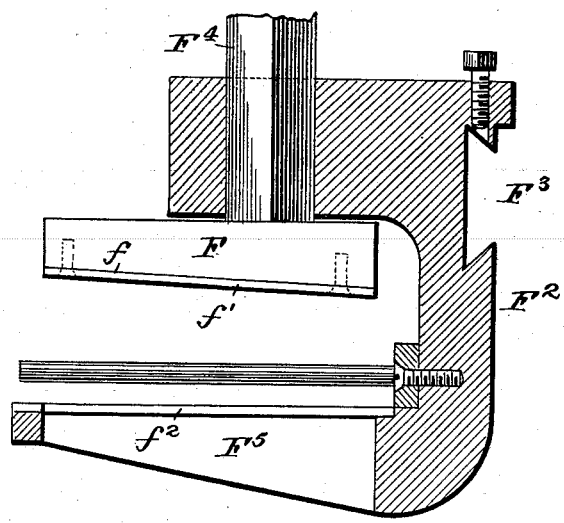
Figure 10:
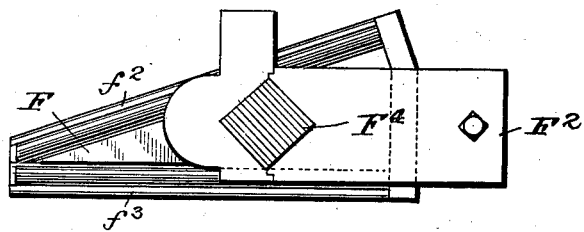
Figure 11:
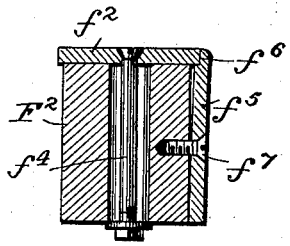

Referring to the accompanying drawings, wherein I have illustrated a preferred embodiment of my invention, Figure 1 is a side view of the machine. Fig. 2 is an enlarged plan view of the main portion of the machine, the source of supply for the material and the guides and tension devices therefor being omitted. Fig. 3 is a vertical longitudinal section of Fig. 2. Fig. 4 is a transverse vertical section on the line 4 4, Fig. 3. Fig. 5 is a similar view on the line 5 5, Fig. 3. Fig. 6 is a plan view of the scoring and cutting table, showing means for adjusting the scorers and cutters. Fig. 7 is an end view of the thumb-hole puncher and cutter. Fig. 8 is a plan view of the lower member of the thumb-hole puncher and cutter. Fig. 9 is an enlarged view in section of the corner cutters or punchers. Fig. 10 is a plan view of the same. Fig. 11 is a detail sectional view showing the means of adjusting the knives of the cutters. Figs. 12 and 13 are views showing the blanks formed on the machine as at present arranged and are illustrated for convenience of description. Fig. 14 is a perspective view of the corner-cutter carrier, and Fig. 15 is a similar view of the auxiliary frame.

One of the principal objects of my present invention is to provide a practical "blanking-machine," as it is usually called—that is, a machine for cutting, scoring, and forming blanks for boxes of paper or other similar material and a machine which can be adjusted to form blanks of different sizes and shapes and which shall at the same time be automatic in its operations. Such a machine may be used in connection with any proper means for securing the parts of the boxes together after the blanks are formed; but in this application I have omitted all such devices, showing only the blanking-machine delivering the completed blanks, which may be manipulated afterward in any desired manner. While it is recognized that machines have been proposed which would accomplish this result to a greater or less extent, my present invention embodies a simple construction and arrangement of parts, all of which can be readily adjusted with relation to each other to form different sized or shaped blanks, and all are so arranged that when they are properly adjusted the operations of the machine are automatic, taking the paper from a reel or other source, progressively cutting, creasing, or scoring the same to form the sides and ends, and finally delivering the complete and severed blank to be operated upon in any desired manner.

With this general statement of the object of my invention I will now proceed to describe in detail the embodiments thereof illustrated in the accompanying drawings, it being understood that my invention is not limited to the precise details of construction and arrangement shown, but that they may be modified by those skilled in the art without departing from the spirit of the invention.

The machine embodies a suitable frame or base A, upon which the operating parts are supported, and in the present instance I have shown in Fig. 1 an extension A', supporting a paper-reel $A^2$ and guide and tension rollers $A^3$ $A^4$ $A^5$, over and between which the paper or other material passes; but as these constitute no part of my invention I have not deemed it necessary to illustrate them in any of the views except Fig. 1. The frame A is preferably made of angle-iron, being shown as composed practically of U-shaped bars in the form of a rectangle, to which the operating parts of the machine are connected and to which the supports or legs $A^6$ are attached. The web of paper or other material from the reel or other source in the present instance passes to the guide B, and this consists of two plates $b$ $b'$, mounted on supports $a$ at each end and attached to the frame A of the machine, and these plates provide a passageway between them for the paper. The plates are provided with longitudinal slots $b^2$, and in these slots move the guide-arms $b^3$, having on their lower ends friction-rollers $b^4$, which friction-rollers come opposite the passage between the plates $b$ and $b'$ and against which the edges of the strip of paper may bear. Some means should be provided for adjusting the guide-arms $b^3$, and in the present instance they are shown as mounted upon a double-screw-threaded shaft B', having a hand-wheel $B^2$ for operating the same and engaging the screw-threaded openings in the upper portion of the guide-arms $b^3$, and it will be seen that by properly turning the hand-wheel $B^2$ the guide-arms $b^3$ are made to approach or recede from each other to accommodate themselves to webs of different widths and at the same time to guide the web centrally through the machine.

Referring to Figs. 12 and 13, it will be seen that Fig. 12 represents what may be called the "bottom portion" of the box, having a bottom 1, sides 2 3, end flaps 4 5, and corner flaps 6 7 8 9. The blanks are scored along the lines 10 and 11, as well as along the lines 12 13, and portions of the blank are cut away at the corners, as on the lines 14 15 16 17. The blank portion shown in Fig. 13 is substantially the same as that in Fig. 12, except that it is intended to form a cover for the box-body, (shown in Fig. 12,) and the scoring and cutting are substantially the same, with the addition of the thumb-holes 18 and 19. The blanks shown in the drawings have only three main portions—that is, the bottom and two sides—outside of the portions forming the ends; but of course it will be understood that blanks having integral therewith four or even five portions forming the bottom, the sides, the top, and folding-flap or other similar forms can be made by using a proper number of corner-punches and scoring and cutting knives; but I have chosen to illustrate a machine for making the blanks shown in the drawings, as this will disclose the principal features of my invention.

The web is drawn into the machine by the feed-rollers D D', which are mounted in housings $a'$, attached to the frame of the machine, and the roller D' is provided with adjusting-screws $d$ for limiting the upward movement of the roller which ordinarily bears by gravity upon the web and coöperates with the roller D, and these rollers are positively and intermittently driven by mechanism hereinafter described and serve not only to draw the web of paper into the machine, but to feed it forward step by step through the machine. Also mounted in the housings $a'$ are the shafts E E' of the longitudinal scoring devices $e$ $e'$. The scoring knives or cutters $e$ $e'$ are adjustably mounted on the shaft E' in any desired manner, as indicated in the drawings, and they coöperate with the grooved rollers $e^2$ on the shaft E, which are also adjustably mounted thereon. Sometimes the web of paper or other material may not be of the exact width to form the blanks desired, or the edges thereof may be irregular, and in that event I provide trimmers, $e^4$ $e^5$, which are also preferably adjustably mounted on the shaft E' and coöperate with similar knives adjustably mounted on the shaft E. (Not shown.) The trimmers of course can be adjusted with proper relation to the scorers, so as to form the end pieces 4 5 of the blanks of the proper width.

As the scored and trimmed strip of material is fed forward intermittently the next operation is to cut out the corner-pieces between the lines 14 15 16 17, &c., and to do this I provide the corner cutters or punches F F', they being arranged in pairs in the present instance and opposite each other, so as to cut all the corners of the blank at one operation. Each of these corner-cutters F is made as a separate and integral structure, so that they may be adjusted in proper relation to each other, and in Figs. 9, 10, and 11 I have shown, on an enlarged scale, the preferred form of making these corner-cutters. Thus there is a U-shaped frame or body $F^2$, having a dovetailed groove $F^3$ to receive the strip for supporting the cutter. Moving through the upper arm of the body portion $F^2$ is the stem $F^4$, carrying on its under side the die or cutter proper, F. The shape of this die or cutter F may vary according to requirements, but is shown as triangular, and its under face $f$ is beveled, and to it is attached a cutting-plate $f'$. The lower arm of the body portion $F^2$ is recessed at $F^5$ to receive the die F and is provided with a cutting-plate $f^2$, adapted to coöperate with the cutting-plate $f'$. This cutting-plate may be in one piece; but it is preferable to make it in two pieces which are adjustable with relation to each other. Thus in Fig. 10 I have shown it as having two plates $f^2$ $f^3$, with their cutting edges approaching and practically in contact at one end and extending away from each other toward the other end and receiving the cutter $f'$ between their cutting edges. As these edges are subject to more or less wear I preferably mount them as shown in Fig. 11, in which the plate $f^2$ or $f^3$, as the case may be, is mounted on an extension of the frame $F^2$ and is held by a bolt $f^4$, passing through an extended slot therein, and on the side of the frame is a plate or bar $f^5$, preferably having a recess or rabbet $f^6$ to engage the edge of the cutting-plate $f^2$ and having an adjusting-screw $f^7$. With this construction it will be seen that by loosening the bolt $f^4$ and tightening the screw $f^7$ the plate $f^2$ can be adjusted to take up for wear. This construction and arrangement of the corner-cutters have proved very convenient and effective and not liable to get out of order. Moreover, it will be seen that the cutter is well adapted to cut corners of different depths, the shape of the cutter being such that at the line of scoring 10 or 11 it reaches practically a point, and one side of the cutter is preferably parallel with the scores 12 and 13, while the other diverges at the desired angle thereto, and it will readily be seen that by adjusting the cutters with proper relations to the other parts the portions desired will be cut away whether the ends of the blank are of greater or less depth, and the upper and lower cutters do not have to be adjusted with relation to each other unless perchance the portion cut away is greater than the entire length of the cutters $f'$ $f^2$. These corner-cutters on the opposite sides of the machine are adjustable with relation to each other, so that different-sized boxes can be cut and so that the end flaps 4 5 of the blank will be of the desired length, and in order to accomplish this the U-shaped frame $F^2$, carrying the cutters, as before described, is provided with a dovetail groove $F^3$ or some equivalent means by which it is mounted on the corner-cutter carrier G, and in this instance this carrier is provided with a dovetail plate $G^3$, fitting the dovetail groove $F^3$, and suitable securing means, as a screw, Fig. 9, is employed to secure the U-shaped frame in proper adjustment. This plate $G^3$ may be provided with a scale, as indicated in Fig. 2, for convenience in adjusting the corner-cutters.

In order to adjust the relations of the corner-cutters on opposite sides of the machine to each other, so that their inner ends will correspond with the scores 10 11 on the blank, the corner-cutter carrier G is made adjustable. While this may be accomplished in various ways, I have shown mounted on the frame of the machine an auxiliary frame H, (best shown in Fig. 15,) comprising the transverse side bars $H'$ $H^2$, connected together by cross-bars $H^3$, and provided with lugs $H^4$ or other suitable means by which it is securely attached to the frame A. The corner-cutter carriers G are mounted to slide on this frame, and in the present instance the side bars $H'$ $H^2$ are dovetailed, as at $h$, to fit the dovetail recesses $g$ in the side bars $G'$ $G^2$ of the carrier G. Connected to the cross-bars $H^3$ is a screw-threaded nut $H^5$, in which works a screw $H^6$, passing through a collar $G^5$ on the cross-bar $G^4$, and this screw is provided with a suitable hand-wheel $H^7$, and it will be readily seen that by operating the hand-wheel and the screw the corner-cutter carriers can be adjusted laterally on the auxiliary frame H and be held in the adjusted position by the screw $H^6$.

Some means must be provided for operating the corner-cutter stems $F^4$ in whatever position they may be adjusted, and in the present instance the corner-cutter carrier G is provided with upwardly-extending arms $G^6$, supporting a shaft I, on which is mounted a rocking frame $I'$, carrying a shaft $I^2$, to which the stems $F^4$ are connected by suitable means, as by the links $I^3$. These links slide longitudinally on the shaft $I^2$ in accordance with the longitudinal adjustments of the corner-cutters, so that whatever the relations of the two corner-cutters on each side of the machine may be their respective stems will be operated simultaneously. This simultaneous operation of the corner-cutters may be accomplished in various ways, and in the present instance I have shown the reciprocating head J, the operations of which will be described hereinafter, as provided with adjustable plates $I^4$, adapted to engage the inner ends of the rocking arms $I'$ and operate the corner-cutters. These plates of course have to be adjusted so as to operate the rocking arms $I'$ whatever may be their lateral adjustment, and I have consequently shown the head J as having a slot in its upward extension $J'$ by means of which the plates $I^4$ are adjusted by proper screws or bolts $I^5$. These plates $I^4$ have in the present instance recesses $I^6$, loosely fitting over the inner ends of the rocking arms $I'$, and it will be observed that when the head J moves downward, the parts being properly adjusted, the corner-cutters are also moved downward to simultaneously cut out corner portions of the blank.

It may be observed that while the corner portions are being cut the blank is supported on the lower arms of the U-frames $F^2$, as best seen in Fig. 4; but in order to further aid in supporting the blank, which is necessary when it is of considerable width, I have shown attached to the auxiliary frame H a supporting-bar $H^8$ through the medium of a standard $H^9$, secured to one of the cross-bars of the auxiliary frame. This additional support is also of importance when the material operated on is of such rigidity that it will not properly support itself while resting on the lower arms of the U-shaped frames of the corner-cutters.

In order to make the transverse scores 12 13 and punch the thumb-holes 18 19 and sever the completed blank, I arrange the requisite cutters and scorers so that they may be adjusted with relation to each other and so that they may be simultaneously operated, and I will now describe the construction shown in the drawings for accomplishing this result.

Mounted on the main frame A is a supporting-frame K, and the desired number of scorers and cutters or other devices are adjustably mounted thereon. In the present instance I have shown two scoring-bars L M and one cutter-bar N and a guide-bar O as mounted on the supporting-frame. In the present instance the top plate of the supporting-frame K is provided with longitudinal grooves $k$ $k^2$ $k^3$, preferably dovetailed, and the cutter and scoring bars are each provided with a projection fitting one of the grooves. Thus, as seen in Fig. 5, the scoring-bar L is provided with a projection $l$, sliding in the groove $k$, and in order to adjust the bars in the grooves I provide the screws P $P'$ $P^2$, and in this instance the screw P engages the projection $l$ on the scoring-bar L and serves to move the bar longitudinally on the supporting-frame and to hold it in the adjusted position. In the same way the screws P' P², &c., are connected to similar projections on the under side of the scoring and cutter bars M and N, and they are similarly adjusted in the grooves of the supporting-frame. Of course it will be understood that where necessary, as in connection with the adjusting-screw P, the openings in the other bars (except the one to which it is attached) are large enough to permit the screws to pass through without operating, and in the bar L, for instance, there is an enlarged opening $l'$ to permit the bar L to slide over the end of the adjusting-screw P'. The guide-bar O in this case is not provided with a set-screw for adjusting it; but it is provided with proper openings, through which the screws P P' pass and which serve to hold it sufficiently stable in its position, although a separate adjusting-screw can be provided for this or any other bar similarly mounted on the supporting-frame. These scoring and cutting bars may be variously arranged; but, as shown, they each consist of two complementary bars, one of which is adjustable on the supporting-frame, and this carries means for supporting and guiding its complementary bar. Thus, for instance, the scoring-bar L is provided with a plate L', having a groove and connected to the plate are the guide-pins L², surrounded by springs L³, on which rests the complementary bar L⁴, carrying a scoring-knife L⁵, and the other bars are similarly constructed, except, of course, the cutter-bar, as N⁴, carries a cutting-knife N⁵, and the plate N' on the bar N is provided with a cutting edge in the usual way. The guide-bar O is provided with suitable edge-guides O' O', which in this instance comprise flanged rollers $o$, mounted on suitable studs $o'$, adjustable in a slot O², and these serve to guide the strip through the cutting and scoring portion of the machine without unnecessary friction.

In order to operate the cutters and scorers simultaneously, various means may be employed, and in the present instance I have shown a reciprocating head J, adapted to be operated in any suitable way from the driving power, and this is preferably made with an adjustable face to compensate for wear or otherwise, and in the present instance I have shown it as provided with a beveled plate J², to which is attached a second beveled plate J³, preferably having a rib $j^3$, sliding in a notch $j^2$ and serving as a guide therefor, and provided with suitable securing means. In the present instance on the edge of the head J is a bracket J⁴, in which is mounted an adjusting-screw $j^5$, and through the heads in enlarged slots therein are the securing screws or bolts J⁵.

When it is desired to form the thumb-holes 18 19 in the blank, of course the proper punch is connected to one of the cutters, and in Figs. 7 and 8 I have shown a cutting-bar N⁶, having a projecting opening N⁷, and on the upper or complementary cutting-bar N⁸ there is mounted an adjustable punch N⁹, so that when it is desired to shift from the body-blanks to the covering-blanks it is only necessary to remove the cutter N and its complementary supported cutter N⁴ and substitute therefor the cutter-bars N⁶ N⁸.

In order to operate the various mechanisms of the machine, any suitable driving-gear may be used, and I will describe that shown in the drawings as illustrative of a preferred form.

In the present instance the belt-wheel R is loosely mounted on a bearing $r$ and can be positively connected by a hand-wheel R' or other suitable means to the spur-gear R², which engages a similar gear R³ on the shaft R⁴. Mounted on the shaft R⁴ are eccentrics R⁵, provided with connecting-rods R⁶, connected to the rod R⁷, fast to the reciprocating head J, so that the head is moved up and down in the proper relations. In this instance the movement of this head also operates the corner-cutters in the manner before described, although it is evident that they may be independently operated, if desired. Also connected to the shaft R⁴ is an adjustable crank R⁸, to which is connected a pitman R⁹, engaging a clutch R¹⁰ on the gear-wheel R¹¹, which in turn is connected to drive the feed-rollers D D' and the cutting and scoring rollers E E' by suitable means, as indicated in Fig. 1. The details of construction of this clutch need not be set forth, as they are well known, any suitable clutch which will produce the desired intermittent operation of these rollers being satisfactory. I have also shown as mounted on the frame delivery-rolls S S', and these are conveniently driven by a belt S² on the belt-wheel S³, mounted on the bearing $r$. The speed of these rolls is such that when they grasp the completed and severed blank it is quickly delivered to a proper receptacle T or to some other series of devices for completing the box or for other purposes.

Having thus described the details of construction of the apparatus illustrated in the drawings, its operation will be clearly understood, and it will be seen that I provide an exceedingly simple construction and arrangement of devices whereby blanks of various sizes and shapes may be continuously and progressively made from a strip of material fed into the machine from a source of supply, and it will be observed that all the operations are automatic in character, and the machine requires little or no personal attention after being once set in operation. It will also be observed that all the adjustments required for various sizes and shapes of blanks can be readily made, and the cutting and scoring devices shown may be substituted by others of different shape or character, according to the requirements of any particular case.

Without limiting myself to the particular details of construction and arrangement set forth, what I claim is—

1. In a blanking-machine, the combination with the feeding and longitudinal scoring devices, of corner-cutting devices adjustable laterally and longitudinally on the machine, transverse scoring and cutting devices separate from and in advance of the corner-cutting devices also adjustable longitudinally on the machine independently of the corner-cutting devices, and means for simultaneously operating the corner-cutting devices and scoring and cutting devices, substantially as described.

2. In a blanking-machine, the combination with the feeding and longitudinal scoring devices, of corner-cutting devices adjustable laterally and longitudinally on the machine, transverse scoring and cutting devices separate from and in advance of the corner-cutting devices adjustable longitudinally on the machine independently of the corner-cutting devices, and means for simultaneously operating the corner-cutting devices and transverse scorers and cutters, substantially as described.

3. In a blanking-machine, the combination with intermittent feeding-rolls and longitudinal scoring-rolls, of corner-cutters adjustable laterally and longitudinally on the machine, transverse scorers and cutters separate from and in advance of the corner-cutters adjustable longitudinally on the machine independently of the corner-cutters, means for operating the feeding devices and longitudinal scorers intermittently, and means for intermittently and simultaneously operating the corner-cutters and the transverse scorers and cutters, substantially as described.

4. In a machine of the general character described in which the web of material is drawn into the machine to be operated upon, a guide comprising two plates having longitudinal slots, guide-arms projecting into the slots, and means for adjusting the arms simultaneously toward or away from each other, substantially as described.

5. In a machine of the general character described in which the web of material is drawn into the machine to be operated upon, a guide comprising two plates having longitudinal slots, guide-arms extending into the slots and provided with friction-rollers, and means for simultaneously adjusting and securing the guide-arms in position in the slots, substantially as described.

6. In a machine of the general character described, the corner-cutters comprising the U-shaped frame, the stem slidably mounted in one arm thereof and carrying cutter-blades, and a complementary cutter-blade mounted on the other arm thereof, substantially as described.

7. In a machine of the general character described, the corner-cutters comprising the U-shaped frame, a stem slidably mounted in one arm of the frame and carrying a beveled cutter-plate, and a coöperating cutter-plate mounted on the other arm, substantially as described.

8. In a machine of the general character described, the combination of the corner-cutters comprising a U-shaped frame, a stem mounted therein, a coöperating cutter also mounted on the frame, a corner-cutter carrier on which the corner-cutter is adjustably mounted, a rocking frame mounted on the corner-cutter carrier, and connections between the rocking frame and stem, substantially as described.

9. In a machine of the general character described, the combination of the corner-cutters comprising a U-shaped frame, a stem mounted therein, a coöperating cutter also mounted on the frame, a corner-cutter carrier on which the corner-cutter is adjustably mounted, a rocking frame mounted on the corner-cutter carrier, and a link adjustably connected to the rocking frame and to the stem; substantially as described.

10. In a machine of the general character described, the combination with an auxiliary frame carrying a supporting-bar, of the corner-cutters, the corner-cutter carriers on which the corner-cutters are adjustably mounted, and means for adjusting the corner-cutter carriers with relation to the supporting-bar, substantially as described.

11. In a machine of the general character described, the combination with a supporting-frame, of a plurality of cutting and scoring bars arranged one in advance of the other and connections between the respective bars and the frame for adjusting each of said bars on the frame independently of the others, substantially as set forth.

12. In a machine of the general character described, the combination with a supporting-frame having grooves, of a plurality of scoring and cutting bars arranged one in advance of the other, each bar having a projection extending into its respective groove in the frame, and connections between the respective bars and frame for adjusting each of said bars on the frame independently of the other bars, as set forth.

13. In a machine of the general character described, the combination with a supporting-frame having grooves, of scoring or cutting bars having projections fitting the grooves, and screws for independently adjusting the scoring or cutting bars on the supporting-frame, substantially as described.

14. In a machine of the general character described, the combination with a supporting-frame, of scoring or cutting bars adjustably mounted thereon each scorer or cutter comprising two bars one of which is provided with guides for the reception of the other bar whereby the two bars may be adjusted or removed together, substantially as described.

15. In a machine of the general character described, the combination with a supporting-frame, of scoring or cutting bars adjustably mounted thereon, a guide-bar also adjustably mounted thereon, and flanged rollers adjustably mounted on the guide-bar, substantially as described.

16. In a machine of the general character described, the combination with a supporting-frame, of scoring or cutting bars adjustably mounted thereon, a reciprocating head for operating the scoring or cutting bars; corner-cutters adjustably mounted on the machine, and connections between the reciprocating head and corner-cutters whereby they are operated in unison, substantially as described.

17. In a machine of the general character described, the combination with a supporting-frame, of scoring or cutting bars adjustably mounted thereon, a reciprocating head for operating the same, corner-cutters, corner-cutter carriers on which the corner-cutters are adjustably mounted, means for adjusting the corner-cutter carriers, a rocking frame connected to the corner-cutter carriers and to the corner-cutters, and connections between the rocking frame and the reciprocating head whereby they are operated in unison, substantially as described.

In testimony whereof I have signed my name to this specification in the presence of two subscribing witnesses.

HORACE INMAN.

Witnesses:
H. B. WALDRON,
H. A. INMAN.